(12) United States Patent
Tulley et al.

(10) Patent No.: US 7,682,240 B2
(45) Date of Patent: *Mar. 23, 2010

(54) SYSTEMS AND METHODS WHEREIN A LOTTERY NUMBER COMBINATION IS ASSOCIATED WITH A LIMITED NUMBER OF OCCURRENCES

(75) Inventors: Stephen C. Tulley, Stamford, CT (US); John M. Packes, Jr., Hawthorne, NY (US); James A. Jorasch, Stamford, CT (US); Jay S. Walker, Ridgefield, CT (US); Patrick J. Buckley, Ridgefield, CT (US); Peter J. Vogel, New Canaan, CT (US); Magdalena M. Fincham, Greenwich, CT (US); Norman C. Gilman, Stamford, CT (US); Keith Bemer, New York, NY (US); Russell Pratt Sammon, Stamford, CT (US); William P. Van Vooren, Norwalk, CT (US); Andrew P. Golden, Stamford, CT (US); Michael F. Steib, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 388 days.

This patent is subject to a terminal disclaimer.

(21) Appl. No.: 11/424,166

(22) Filed: Jun. 14, 2006

(65) Prior Publication Data

US 2006/0223617 A1   Oct. 5, 2006

Related U.S. Application Data

(63) Continuation of application No. 10/730,244, filed on Dec. 8, 2003, which is a continuation of application No. 09/608,245, filed on Jun. 30, 2000, now Pat. No. 6,688,976.

(60) Provisional application No. 60/200,838, filed on May 1, 2000.

(51) Int. Cl.
  *A63F 3/06* (2006.01)
  *A63F 3/08* (2006.01)
(52) U.S. Cl. .............................. 463/17; 463/18; 463/19
(58) Field of Classification Search .............. 463/17–19
  See application file for complete search history.

(56) References Cited

U.S. PATENT DOCUMENTS 4,398,708 A    8/1983  Goldman et al. .............. 270/18

(Continued)

OTHER PUBLICATIONS

"Hitting the Pennsylvania Lottery $100 Million Jackpot: How to Make the Most of the Odds", PR Newswire, Apr. 25, 1989.

(Continued)

*Primary Examiner*—Peter DungBa Vo
*Assistant Examiner*—Frank M Leiva
(74) *Attorney, Agent, or Firm*—Walker Digital Management, LLC

(57) ABSTRACT

Systems and methods are provided to facilitate lottery ticket transactions. A request to purchase a lottery ticket is received, the lottery ticket being associated with a lottery number combination, such as a limited number of lottery tickets or a limited number of players. An indication that the lottery number combination is to be associated with a limited number of occurrences is also received. For example, an indication that the lottery number combination is to be associated with only a single lottery ticket may be received. A price associated with the lottery ticket is determined based on the received indication. According to one embodiment, the price is increased by a predetermined amount based on the received indication.

66 Claims, 10 Drawing Sheets

U.S. PATENT DOCUMENTS

| | | | | |
|---|---|---|---|---|
| 4,665,502 | A | 5/1987 | Kreisner | 364/900 |
| 4,852,268 | A | 8/1989 | Sutherland et al. | 33/562 |
| 4,922,522 | A | 5/1990 | Scanlon | 379/95 |
| 5,157,602 | A | 10/1992 | Fields et al. | 364/412 |
| 5,791,990 | A | 8/1998 | Schroeder et al. | 463/17 |
| 5,830,063 | A | 11/1998 | Byrne | 463/18 |
| 5,855,514 | A | 1/1999 | Kamille | 463/17 |
| 5,910,047 | A | 6/1999 | Scagnelli et al. | 463/17 |
| 5,954,582 | A | 9/1999 | Zach | 463/25 |
| 5,996,997 | A | 12/1999 | Kamille | 273/139 |

OTHER PUBLICATIONS

"New National Phone Service Helps Lotto Players Increase Their Chances of Winning", PR Newsletter, Jan. 17, 1990.

"Grapevine", Time, Jan. 22, 1990, Section: Nation, p. 25.

Cochrane, Lynn, "fever to spot one millionaire", The Scotsman, Nov. 12, 1994, p. 5.

"How I'll Break Lottery Bank; Punter Says He Can Win Again; Irish Lottery Heist Mastermind Warns of Syndicate Hits On National Lottery", Daily Mirror, Nov. 18, 1994, Section: News p. 2.

"First Double Lotto Jackpot Pays Out Big; Search is On for $16 Million Ticket Holder", PR Newswire, Sep. 1996, Section: State and Regional News.

"A better bet than most: Premium bonds:", Financial Times (London), Aug. 30, 1997.

"Our Opinion State scamming lottery buyers", York Daily Record, Apr. 9, 1998, p. A14, ISSN: 1043-4313.

"A numbers game", The Boston Globe, Aug. 1, 1998.

Broom, Jack, "State Revving Up Lottery Sales With Chances to Win SUVS", The Seattle Times, Jun. 2, 1999, Section: Local News, p. B1.

"Maxnet—MXNT and www.MyBestBet.com in Promotion Agreement", Business Wire, Jul. 14, 1999.

"How small is a bit?", EXE, Sep. 1, 1999, Section: Techniques, pp. 29-36.

"Lotto prize_$1000 a day", The Press (Christchurch), Nov. 16, 1999, Section: News, National, p. 3, In Brief News.

Mcgurran, Aidan, "www.lottery.com; Tyccons Bid For Net Jackpot", The Mirror, Feb. 7, 2000, Section: News, p. 17.

"Charities bet on lottery", Gloucestershire Echo, Feb. 12, 2000, Section: News, People, p. 17.

"Star Kiki to launch lottery", Express & Echo (Exeter), Feb. 22, 2000, Section: p. 12.

"NCR Relationship Technology Solutions Deliver The Power to Know Millions of Customers, Suppliers, Partners; NCR at CeBIT 2000 in Germany", PR Newswire, Feb. 23, 2000, Section: Financial News.

"Frequently Asked Questions About UK National Lottery Tickets", (http //lottery merseyworld com/Info/FAQ_tickets html), download date: Apr. 3, 2000.

"Let the New Global Lottery maineea Begin; Pool of Luck Private Partnership Lottery Program", (http //www automatedbiz com/poolofluck/completeinfo htm), download date: Apr. 14, 2000.

"The UK National Lottery Lucky Dip", (http //lottery merseyworld c.../lottery?), download date: Apr. 28, 2000.

"Newton's Telecom Dictionary", CMP Books, New York, 2001, p. 217.

"Helping yourself will help the hospice", Derby Evening Telegraph, Feb. 18, 2000, Section: Health: Hospices, p. 21.

| NUMBER COMBINATION 402 | TICKET IDENTIFIER 404 | RETAILER LOCATION 406 | DATE AND TIME OF PURCHASE 408 | MAXIMUM NUMBER OF TICKETS 410 | PRICE 412 | WINNING AMOUNT AT TIME OF PURCHASE 414 |
|---|---|---|---|---|---|---|
| 1, 2, 3, 4, 5, 9 | T34729 | ITHACA, NY | 03:32 4/4/02 | 1 | $2.00 | N/A |
| 1, 2, 3, 4, 5, 7 | T13235 | CUMMAQUID, MA | 03:56 4/4/02 | 2 | $1.75 | N/A |
| 1, 2, 3, 4, 5, 7 | T64312 | BETHEL, ME | 05:43 4/4/02 | NO MAXIMUM | $1.00 | N/A |
| 1, 2, 3, 4, 5, 6 | T31457 | NEW ORLEANS, LA | 08:23 4/4/02 | NO MAXIMUM | $1.00 | N/A |
| 1, 2, 3, 4, 5, 12 | T63243 | NEW YORK, NY | 12:06 4/4/02 | 3 | $1.20 | N/A |
| 1, 2, 3, 4, 5, 10 | T12356 | STAMFORD, CT | 15:54 4/4/02 | NO MAXIMUM | $1.00 | $3,789,234 |

| NUMBER COMBINATION IDENTIFIER 502 | NUMBER COMBINATION 504 | NUMBER OF TICKETS PURCHASED 506 | MAXIMUM NUMBER OF TICKETS 508 |
|---|---|---|---|
| NC000001 | 1, 2, 3, 4, 5, 6 | 3 | NO MAXIMUM |
| NC000002 | 1, 2, 3, 4, 5, 7 | 2 | 2 |
| NC000003 | 1, 2, 3, 4, 5, 8 | 1 | NO MAXIMUM |
| NC000004 | 1, 2, 3, 4, 5, 9 | 1 | 1 |
| NC000005 | 1, 2, 3, 4, 5, 10 | 1 | 1 |
| NC000006 | 1, 2, 3, 4, 5, 11 | 0 | NO MAXIMUM |

SYSTEMS AND METHODS WHEREIN A LOTTERY NUMBER COMBINATION IS ASSOCIATED WITH A LIMITED NUMBER OF OCCURRENCES

CROSS-REFERENCES TO RELATED APPLICATIONS

The present application is a continuation of U.S. patent application Ser. No. 10/730,244 entitled "SYSTEMS AND METHODS WHEREIN A LOTTERY NUMBER COMBINATION IS ASSOCIATED WITH A LIMITED NUMBER OF OCCURRENCES", filed Dec. 8, 2003;

which is a continuation of U.S. patent application Ser. No. 09/608,245 entitled "SYSTEMS AND METHODS WHEREIN A LOTTERY NUMBER COMBINATION IS ASSOCIATED WITH A LIMITED NUMBER OF OCCURRENCES", filed Jun. 30, 2000 now U.S. Pat. No. 6,688,976;

which claims the benefit of U.S. Provisional Application No. 60/200,838 entitled "METHODS AND APPARATUS FOR DETERMINING A LOTTERY TICKET PRICE BASED ON A LOTTERY TICKET PARAMETER", filed May 1, 2000.

The present application is related to: U.S. patent application Ser. No. 09/525,875 entitled "SYSTEM AND METHOD FOR APPLYING LOTTERY MULTIPLIERS", filed Mar. 14, 2000; U.S. patent application Ser. No. 09/052,295 entitled "METHODS AND APPARATUS WHEREIN A LOTTERY ENTRY IS ENTERED INTO LOTTERY DRAWINGS UNTIL THE LOTTERY ENTRY IS IDENTIFIED AS A WINNER", filed Mar. 31, 1998; U.S. patent application Ser. No. 09/107,971 entitled "METHOD AND APPARATUS FOR FACILITATING THE PLAY OF FRACTIONAL LOTTERY TICKETS UTILIZING POINT-OF-SALE TERMINALS", filed Jun. 30, 1998; and U.S. Provisional Patent Application No. 60/205,276 entitled "LOTTERY SNITCH", filed May 18, 2000.

Each of the above-referenced applications is incorporated by reference herein in its entirety.

This application is also related to the following U.S. Patent Applications:

U.S. patent application Ser. No. 11/424,155 entitled "SYSTEMS AND METHODS WHEREIN A LOTTERY NUMBER COMBINATION IS ASSOCIATED WITH A LIMITED NUMBER OF OCCURRENCES", filed Jun. 14, 2006;

U.S. patent application Ser. No. 11/424,162 entitled "SYSTEMS AND METHODS WHEREIN A LOTTERY NUMBER COMBINATION IS ASSOCIATED WITH A LIMITED NUMBER OF OCCURRENCES", filed Jun. 14, 2006;

U.S. patent application Ser. No. 11/531,735 entitled "SYSTEMS AND METHODS WHEREIN A LOTTERY NUMBER COMBINATION IS ASSOCIATED WITH A LIMITED NUMBER OF OCCURRENCES", filed Sep. 14, 2006;

U.S. patent application Ser. No. 11/531,741 entitled "SYSTEMS AND METHODS WHEREIN A LOTTERY NUMBER COMBINATION IS ASSOCIATED WITH A LIMITED NUMBER OF OCCURRENCES", filed Sep. 14, 2006;

U.S. patent application Ser. No. 11/531,744 entitled "SYSTEMS AND METHODS WHEREIN A LOTTERY NUMBER COMBINATION IS ASSOCIATED WITH A LIMITED NUMBER OF OCCURRENCES", filed Sep. 14, 2006;

U.S. patent application Ser. No. 11/531,749 entitled "SYSTEMS AND METHODS WHEREIN A LOTTERY NUMBER COMBINATION IS ASSOCIATED WITH A LIMITED NUMBER OF OCCURRENCES", filed Sep. 14, 2006; and U.S. patent application Ser. No. 11/531,754 entitled "SYSTEMS AND METHODS WHEREIN A LOTTERY NUMBER COMBINATION IS ASSOCIATED WITH A LIMITED NUMBER OF OCCURRENCES", filed Sep. 14, 2006.

FIELD

The present invention relates to lotteries. In particular, the present invention relates to systems and methods wherein a lottery number combination is associated with a limited number of occurrences, such as a limited number of lottery tickets or a limited number of players.

BACKGROUND

Players enjoy playing lottery games in part because of the large prizes that can be won. In particular, players are attracted to the possibility of winning, and spending, such large prizes. This can be seen, for example, by the increased number of players who purchase lottery tickets as the size of a lottery prize increases. In some cases, a lottery prize reaches hundreds of millions of dollars and players spend a considerable amount of money and time purchasing lottery tickets. Moreover, even people who do not typically purchase lottery tickets are tempted to do so when a lottery prize grows large enough. This behavior is often reinforced by stories, such as news reports, about players who have won such large lottery prizes.

A problem with typical lottery games, however, is that if two or more players are both associated with a particular winning lottery number combination, the players are required to share the lottery prize. For example, in a "6/49" lottery game, there are approximately fourteen million potential lottery number combinations. If twenty million people purchase lottery tickets for such a game, it is more likely than not that two people will be required to share the lottery prize.

This risk increases as the size of the lottery prize, and thus the number of lottery tickets that are purchased, increases. That is, as the number of lottery tickets that are purchased increases it becomes more likely that one or more other players will be associated with the same lottery number combination. Thus, the largest lottery prizes are often divided among two or more winning players, reducing the incentive people have to play the lottery game in the first place. Therefore, a lottery game provider may be able to increase lottery ticket sales, and profits, if players who win could reduce the risk of, or completely avoid, having to share a lottery prize.

Note that, with respect to the cost of a lottery prize, a lottery game provider may not be concerned with whether the prize is won by a single player or is shared by a number of players. That is, the amount of the lottery prize the lottery provider pays out is the same in both cases. In some cases, a lottery game provider may prefer that a single player win a lottery prize because of the amount and type of publicity generated by such a result.

Another way to view the above problem is to consider the expected value of a lottery ticket. A first lottery ticket associated with a lottery number combination that is not associated with any other lottery ticket has a higher expected value to a player than a second lottery ticket associated with a lottery number combination that is also associated with one or more other lottery tickets. As a result, players may be willing to pay a higher price for the first lottery ticket. Moreover, the cost of the first and second lottery tickets to the lottery game provider may be the same (e.g., the lottery game provider may payout the same top prize whether or not the two lottery tickets are associated with the same lottery number combination). Thus, a lottery game provider may be able to increase profits if it can receive a higher price for the first lottery ticket. In addition, awarding large prizes to a single player may result in increased interest in the lottery game, and thus more lottery tickets may be sold further increasing profits and prizes.

As can be seen, a need exists for improved systems and methods to facilitate lottery ticket transactions.

SUMMARY OF THE INVENTION

To alleviate problems inherent in the prior art, the present invention introduces systems and methods for facilitating the sale of a lottery ticket (e.g., the sale of the lottery ticket to a player), where the lottery ticket is associated with a number combination.

In one embodiment of the present invention, a request to purchase a lottery ticket is received. An indication that the lottery number combination is to be associated with a limited number of occurrences is also received. A price associated with the lottery ticket is determined based on the received indication.

In another embodiment, a request to purchase a lottery ticket is received from a player. An indication that the lottery number combination is to be associated with a limited number of lottery tickets is also received from the player. A price associated with the lottery ticket is determined based on the received indication. The lottery number combination is also determined, and it is arranged for the player to purchase the lottery ticket. Payment of an amount based on the determined price is received from the player, and the lottery ticket is provided to the player. At least one other lottery ticket is prevented from being associated with the lottery number combination. Based on the lottery number combination and a result of a lottery drawing, it is arranged for the player to receive payment of a winning amount.

In still another embodiment, a request to purchase a pari-mutuel lottery ticket is received. A price associated with the pari-mutuel lottery ticket is determined based on an expected value of the lottery ticket to a player.

Another embodiment of the present invention comprises: means for receiving a request to purchase a lottery ticket; means for receiving an indication that the lottery number combination is to be associated with a limited number of occurrences; and means for determining a price associated with the lottery ticket based on the received indication.

Another embodiment comprises: means for receiving from a player a request to purchase a lottery ticket; means for receiving from the player an indication that the lottery number combination is to be associated with a limited number of lottery tickets; means for determining a price associated with the lottery ticket based on the received indication; means for determining the lottery number combination; means for arranging for the player to purchase the lottery ticket; means for receiving, from the player, payment of an amount based on the determined price; means for providing the lottery ticket to the player, means for preventing at least one other lottery ticket from being associated with the lottery number combination; and means for arranging for the player to receive payment of a winning amount based on the lottery number combination and a result of a lottery drawing.

Still another embodiment comprises: means for receiving a request to purchase a pari-mutuel lottery ticket; and means for determining a price associated with the pari-mutuel lottery ticket based on an expected value of the lottery ticket to a player.

With these and other advantages and features of the invention that will become hereinafter apparent, the nature of the invention may be more clearly understood by reference to the following detailed description of the invention, the appended claims, and the several drawings attached herein.

BRIEF DESCRIPTION OF THE DRAWINGS

FIG. 4 is a tabular representation of a portion of a purchased number combinations database according to an embodiment of the present invention.

FIG. 5 is a tabular representation of a portion of a potential number combinations database according to an embodiment of the present invention.

DETAILED DESCRIPTION

Figure 1:
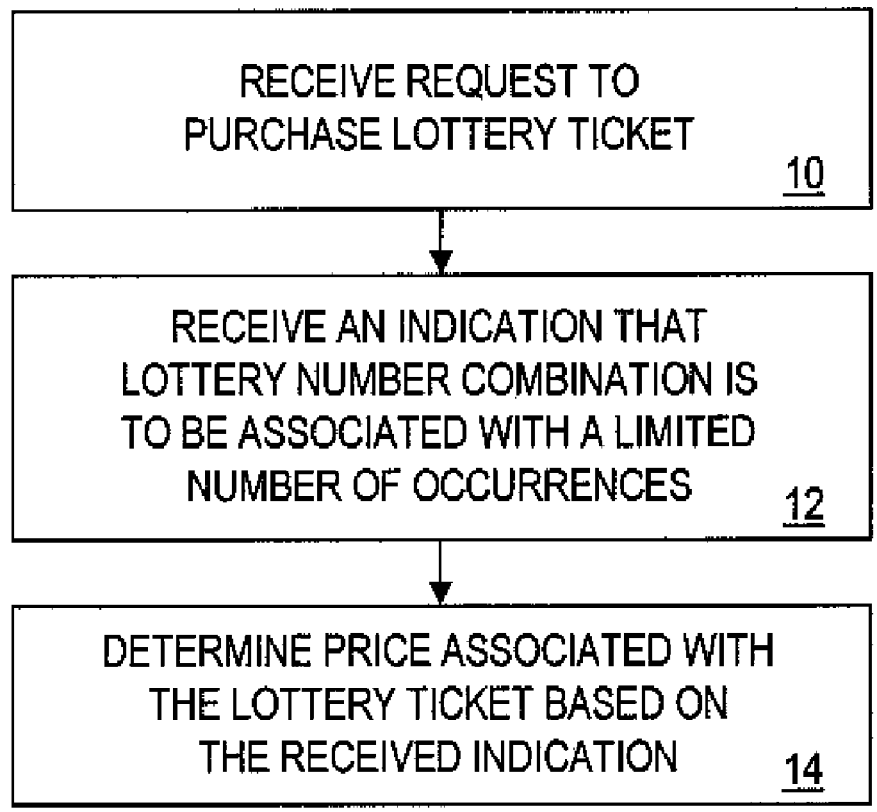
FIG. 1 is a flow chart of a method of facilitating lottery ticket transactions according to an embodiment of the present invention.

The present invention is directed to systems and methods to facilitate lottery ticket transactions. Turning now in detail to the drawings, FIG. 1 is a flow chart of a method according to an embodiment of the present invention.

At 10, a request to purchase a lottery ticket is received. As used herein, the term "lottery ticket" shall refer to any type of ticket, including an electronic representation of a ticket, used in any type of lottery game offered by a lottery game provider, such as a "pari-mutuel" drawing-type lottery game. As used herein, a pari-mutuel type game includes any game in which winning players may be required to share at least one of the prizes. Note that a pari-mutuel type game may also include one or more other prizes that players would not be required to share. Examples of pari-mutuel type games include racetrack betting and lottery games.

Lottery games include any number of variations and combinations. A lottery ticket may be formed as one or more cards which are made of paper, cardboard, plastic, or any other suitable material and may include identification and game playing information printed thereon. Alternatively, lottery tickets may be represented magnetically, optically, or electronically. For example, lottery tickets may be represented as electronic characters or images in a memory or on a video monitor that are generated and stored on a computer or other information device. Furthermore, electronic lottery tickets may be used in a lottery game conducted over a computer network such as the Internet. Further, lottery tickets may be embodied as magnetic stripes on cards, patterns on magneto-optical media, and/or bit patterns in a smart card.

In accordance with a pari-mutuel drawing-type lottery game, players purchase lottery tickets which each include one or more sets of symbols, referred to herein as a "lottery number combination." Note that a lottery number combination may comprise a single number. In addition, the order of the numbers within a combination may or may not be significant.

A lottery ticket for such a lottery game may include, for example, a set of six lottery numbers (or a "lottery number combination"), each number being selected from the numbers "1" through "49," inclusive. Note that a single paper lottery ticket may include several lottery number combinations.

In a typical drawing held by a lottery game provider, six winning lottery numbers from within the range of "1" through "49" are randomly determined. A lottery player compares the six lottery numbers on his or her lottery ticket, acquired before the drawing, with the six winning lottery numbers. A lottery player with a ticket having a sufficient number of matching lottery numbers, as defined by the particular lottery's rules, will win a prize (typically a monetary prize) also as defined by the lottery's rules. In a pari-mutuel lottery game, a top prize (or "jackpot") may be awarded when a player matches all six winning lottery numbers. The top prize is often based at least in part on a total number of lottery tickets that have been purchased, and is typically shared when two or more players have matched all six winning lottery numbers.

For a more detailed description of how conventional lotteries operate, see "Dr. Z's 6/49 Lotto Guidebook" by Dr. William T. Ziemba et al., 1986, printed by Ronalds Printing, published by Dr. Z Investments Inc., which is incorporated herein by reference.

According to one embodiment, a player provides a request to purchase a lottery ticket to an operator of a lottery terminal at a retail store. Examples of retail stores where lottery tickets are typically purchased include convenience stores, delicatessens, gasoline stations, supermarkets, and online lottery Web sites. As described above, the lottery ticket may be associated with a lottery number combination (e.g., "4, 9, 12, 24, 32, 38").

According to one embodiment, the lottery number combination is "manually" selected by the player (e.g., based on one or more birthdays). For example, a player may use a pencil to mark six numbers on a machine-readable lottery ticket slip. According to another embodiment, the lottery number combination is selected by a lottery system (e.g. a player device, a retail store device, or a central lottery device). For example, the lottery system may use a "quick pick" random process to select a lottery number combination for a player.

Although embodiments of the present invention are described with respect to a lottery number combination, any other lottery symbols may be used instead (e.g., alphanumeric characters, colors, shapes, and/or pictures).

Referring again to FIG. 1, at 12 an indication is received that the player's lottery number combination will only be associated with a limited number of "occurrences." For example, the player may indicate that his or her lottery number combination will only be associated with a single ticket (e.g., the ticket he or she is purchasing). As another example, the player may indicate that the lottery number combination will only be associated with a single player. In this way, the player can make sure that he or she will not be required to share a top lottery prize with another player—because no other player will have the same lottery number combination. The player may instead indicate that the lottery number combination will be associated with, for example, a maximum of two occurrences. In this case, the player knows that if all six winning lottery numbers are matched, he or she will receive at least 50% of the top lottery prize. Instead of being associated with a limited number of tickets, a player may indicate that the lottery number combination will only be associated with a limited number of players (e.g., two players).

According to one embodiment, the player is assured that his or her lottery number combination will not be associated with another ticket (or player) prior to a lottery drawing. For example, a player may be informed that a lottery number combination will not be associated with any other lottery tickets. According to another embodiment, however, the player is merely assured that his or her lottery number combination is currently associated with only a limited number of occurrences, without any assurances concerning future lottery ticket transactions. For example, a player may be informed that a lottery number combination generated by a quick pick process is guaranteed to be unique at the time he or she purchases the ticket, but that the same lottery number combination may later be associated with another ticket or player. Note that the lottery system may determine a number of occurrences that are "currently" associated with a lottery ticket number combination on a periodic (e.g., nightly) or a non-periodic basis.

According to another embodiment, a player may be assured that a lottery number combination will be associated with no more than a current number of occurrences that are already associated with that lottery number combination. For example, a player may be informed that although one or more other players may have previously selected that lottery number combination, no more players will be allowed to do so in the future. According to other embodiments, a player may be assured that a lottery number combination will not be assigned to another player via a quick pick process, but that another player would be allowed to manually select that lottery number combination (or vice versa). Note that combinations of these various approaches may be used.

The indication that the lottery number combination is to be associated with a limited number of occurrences may be provided with respect to a single lottery drawing, a predetermined number of lottery drawings (e.g., a lottery ticket subscription), or any other number of lottery drawings (e.g., a lifetime of lottery drawings or all future lottery drawings).

Note that the received indication may, according to one embodiment, include the actual number of occurrences that may be associated with a number combination. The indication also may comprise a predetermined "type" of lottery ticket and/or lottery ticket slip associated with the lottery ticket.

At 14, a price associated with the lottery ticket is determined based on (i.e., based at least in part on) the received indication. For example, a typical lottery ticket may have a price of $1.00. If, however, an indication is received that the player's lottery number combination will only be associated with a single ticket the price may be increased to $1.50.

Instead of simply determining whether a first price or second price should be associated with the lottery ticket, the lottery system may calculate an appropriate lottery ticket price. For example, the lottery system may calculate the lottery ticket price based on the limited number of occurrences and a predetermined formula (e.g., the lottery ticket price=a base price+[$1.00 divided by the limited number of occurrences]). The lottery system may also calculate the lottery ticket price using, for example, a predetermined rule or a predetermined table. Table I is an example of a table that may be used to determine the lottery ticket price.

TABLE I

Lottery Ticket Prices

| Maximum Number of Occurrences | Lottery Ticket Price |
|---|---|
| 1 | $2.50 |
| 2 | $1.75 |
| 3 | $1.50 |

TABLE I-continued

Lottery Ticket Prices

| Maximum Number of Occurrences | Lottery Ticket Price |
|---|---|
| 4 | $1.25 |
| 5 | $1.10 |
| more than 5 | $1.00 |

According to one embodiment, the lottery ticket price may be based on a number of occurrences currently associated with the lottery number combination. For example, a lottery number combination that is currently associated with no more than one other lottery ticket may cost more than a lottery number combination that is currently associated with more than one other lottery ticket.

Note that information other than the maximum number of occurrences may be used to determine a price. For example, the price may be based on an expected value associated with the lottery ticket (e.g., the expected value of the lottery ticket to the player at the time he or she purchases the lottery ticket) or an expected cost or value associated with the lottery ticket to a lottery provider. Similarly, demographic information or player history information may be used to determine the price of the lottery ticket.

Note that the price may be independent of a cost of the lottery ticket to a lottery game provider. For example, consider a pari-mutuel lottery game for which lottery tickets typically cost $1.00. In this case, a lottery authority may divert $0.50 of each and every ticket to be used for a top jackpot pari-mutuel prize and smaller, non-pari-mutuel prizes (keeping the remaining $0.50 as profit). As more lottery tickets are sold, the size of the top jackpot increases—increasing the expected value of the lottery tickets to players without changing the cost of the lottery tickets to the lottery authority. Moreover, if no player wins a lottery drawing, at least some of the prize money may be carried over and applied to a second lottery drawing. In this case, lottery tickets sold for the second lottery drawing may be associated with a higher expected value to players without changing the cost of the lottery tickets to the lottery authority. According to one embodiment, the price of such lottery tickets may be increased (e.g., players who purchase lottery tickets when the top jackpot prize is less than ten million dollars are required to pay $1.00 and players who purchase lottery tickets when the top jackpot prize is at least ten million dollars are required to pay $1.50).

According to one embodiment, an indication of a number of occurrences currently associated with the lottery number combination may be displayed to the player. For example, the player may be informed that the lottery number combination he or she selected is currently associated with one other player, and that he or she can select a different lottery number combination if desired. The player may also be informed that he or she can pay a premium to make sure that no additional players are associated with that lottery number combination (e.g., "blocking" other players from selecting that lottery number combination in the future).

In addition to determining a price, the lottery system may arrange for a player to purchase the lottery ticket. For example, the lottery system may receive from the player payment of an amount based on the determined price and provide the lottery ticket to the player (e.g., by printing a lottery ticket for the player). The lottery system may also arrange for the player to receive payment of a winning amount based upon a result of a lottery drawing.

As described above, a player may indicate that his or her numbers are to be associated with no more than a limited number of occurrences. Consider, for example, a first player who purchases a first lottery ticket and selects a first lottery number combination. The first player indicates that the first lottery number combination should only be associated with his or her ticket. The player may pay an increased lottery ticket price to make sure that he or she will not have to share a prize if the first lottery number combination is selected as the winning lottery number combination.

A second player then attempts to purchase a second lottery ticket having the same lottery number combination. In this case, the lottery system provides an indication that the second lottery ticket will not be sold to the second player. For example, the second player may receive a message saying "Sorry, the lottery numbers you selected have already been reserved by another player." In this case, the lottery system may ask the second player to select a new lottery number combination or may suggest that the second player change one of his or her numbers (e.g., "If you replace the third number you selected with '35' then the lottery number combination would be available").

Note that if the second player uses a quick pick process to generate his or her lottery number combination, the lottery system may avoid this problem by selecting the second lottery number combination from a set of appropriate lottery number combinations (e.g., from all of the lottery number combinations that have not been restricted by other players). According to one embodiment, the lottery system may randomly generate individual numbers one at a time. If the entire number combination that is generated is not appropriate, one or more of the individual numbers may be re-generated.

According to another embodiment, the second player may select some, but not all, of his or her lottery numbers. For example, the second player may select the month and day of two birthdays (for a total of four selected numbers) and ask that the lottery system select the remaining two numbers. The lottery system may then select the remaining two numbers based on the available number combinations.

According to one embodiment, the price of the second lottery ticket may be adjusted based on the indication received from the first player. Assume, for example, that the first player had indicated that no more than two tickets are to be associated with the first lottery number combination. If the second player also attempts to select that lottery number combination, he or she may be informed that "the lottery number combination you selected will cost 15% more than the normal ticket price, but we guarantee that only one other player will have the same lottery number combination."

Instead of adjusting the price of a lottery ticket in exchange for limiting the number of occurrences, the lottery system may instead adjust a prize associated with the lottery ticket. For example, a player may agree to accept only 90% of any potential winnings in exchange for a promise that no other players will share his or her lottery number combination. According to another embodiment, a player may agree to forego one or more lesser prizes in exchange for such a promise (e.g., a $5.00 prize won when his or her lottery number combination includes three of the six winning numbers). Similarly, a player may agree to accept payment of any potential winnings in installments in exchange for such a promise.

Instead of preventing other lottery tickets from being associated with a lottery number combination, the lottery system may instead assure the player that he or she will win a full or total winning amount even if the lottery ticket and another lottery ticket both win a lottery drawing. For example, a first player may purchase a lottery ticket for a lottery game having a top prize of one million dollars and select a first lottery number combination. The first player may also pay a premium to the lottery system in exchange for a promise that he or she will receive an amount equal to the top prize regardless of whether another player has also purchased a lottery ticket associated with the same lottery number combination.

The lottery system, however, does sell another lottery ticket associated with the same lottery number combination to a second player, who does not elect to pay the premium. In this case, if the lottery number combination is determined to be the winning lottery number combination, the first player will receive the full one million dollar prize. The second player, however, will receive only half of that amount (e.g., the amount that he or she would have received if the one million dollar prize had been divided among the two winning players). In effect, the lottery system has "insured" the first player against the risk of sharing the top prize. Note that the lottery system may similarly guarantee that the first player will win (e.g., will win at least) any other predetermined percentage or predetermined amount (e.g., at least 75% of the top prize).

Instead of determining a price (or a prize) based on a limited number of occurrences, the lottery system may determine a price (or a prize) based on an expected value or cost associated with the lottery ticket. Consider, for example, a player who selects a lottery number combination that has been popular in the past. In this case, the expected value of the lottery ticket may be less than a ticket associated with unpopular lottery numbers (because the player is more likely to share his or her winnings based on a likelihood of the lottery number combination being selected). The lottery system may determine that either an increased or decreased lottery ticket price is appropriate.

Other factors that may influence the expected value of a lottery ticket include, for example, a total number of lottery tickets that are sold (or a rate at which lottery tickets are being sold), a current number of occurrences associated with a lottery number combination, and a current winning amount (e.g., a current top prize). For example, a player may pay a reduced price in exchange for agreeing to accept a current winning amount as the top prize, even if the top prize is eventually increased (e.g., because a large number of lottery tickets are purchased by other players).

According to another embodiment, lottery tickets are typically associated with a limited number of occurrences. In this case, a player may indicate that his or her lottery number combination can be associated with an unlimited number of occurrences, and a reduced price may be determined for the player's lottery ticket. Instead of a reduced price, another benefit may instead be provided to the player. For example, the player may receive an additional lottery ticket for free.

According to one embodiment, a reduced price (or an increased prize) may be applicable when it is known that a certain number of lottery tickets associated with a particular number combination have been or will be sold. Consider, for example, a lottery game for which lottery tickets typically cost $1.00. In this case, the lottery system 200 may determine that a predetermined subset of lottery number combinations will always be associated with two occurrences (e.g., the lottery system 200 may use a quick-pick process to make sure that each of these lottery number combinations are associated with two, and only two, lottery ticket occurrences). In this case, the lottery system 200 may determine that such tickets are associated with a price of $0.50. Such an approach may, for example, encourage play by people who are not willing to spend the full $1.00 for a lottery ticket. According to one embodiment, such an approach may be used to provide lottery tickets to players in exchange for an amount of change they would have otherwise received in a transaction (e.g., a transaction in which a player purchases a gallon of milk at a grocery store). Some systems for providing lottery tickets in this situation are described in U.S. patent application Ser. No. 09/107,971 entitled "Method and Apparatus for Facilitating the Play of Fractional Lottery Tickets Utilizing Point-Of-Sale Terminals."

According to one embodiment, a player indicates a minimum number of occurrences that are to be associated with his or her lottery number combination. For example, a player may provide a $10.00 payment in exchange for lottery tickets, each lottery ticket having a lottery number combination that will be associated with no less than ten other lottery tickets. In this case, the lottery system 200 may determine that the player should receive one hundred such lottery tickets in exchange for his or her $10.00 payment. Note that such an approach, in effect, "pools" players into groups so that they may receive an increased number of lottery tickets (although any winnings associated with these lottery tickets will have to be shared with other players). Such an approach may, for example, encourage play by people who feel that a single lottery number combination will not provide them with a sufficient likelihood of winning a top jackpot prize.

EXAMPLES

Figure 9:
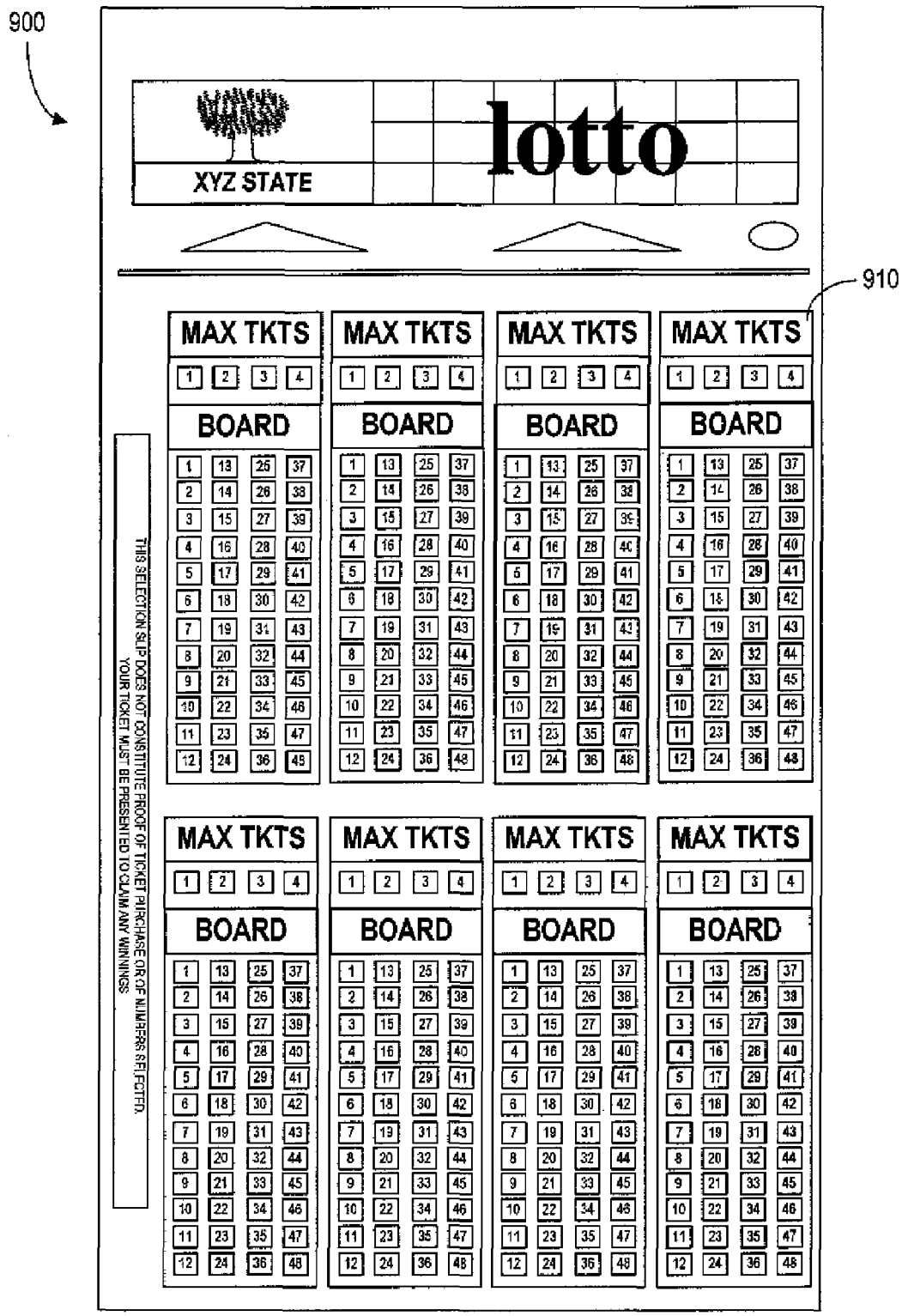
FIG. 9 is a lottery ticket slip according to an embodiment of the present invention.

Alice visits a retail store and obtains a lottery ticket slip 900 as shown in FIG. 9. She selects the month and day of her birthday and her favorite lucky number, for a total of three lottery numbers. She then selects three additional numbers having no special significance, for a total of six lottery numbers. She uses a pencil to mark the lottery ticket slip 900 with her six lottery numbers and further indicates on the lottery ticket slip 900 (e.g., by placing a mark inside a "MAX TKTS" selection box 910 labeled "1") that no other lottery ticket should be associated with her six selected lottery numbers.

An employee at the retail store enters information from the lottery ticket slip 900 into a lottery terminal that reads the marks and transmits the information to a central lottery authority. The central lottery authority determines, however, that Alice's six lottery numbers have already been associated with two other lottery tickets. A message is displayed to Alice stating that the lottery number combination she requested is not available, but if she agrees to change her sixth lottery number from "36" to "37," that lottery number combination would be available. Because the sixth lottery number had no special significance to Alice, she agrees to change the last number of the combination.

Although normal lottery tickets cost $1.00, the lottery system had previously determined that the price for lottery tickets associated with a single occurrence would always be $2.50. Alice pays $2.50 and receives a lottery ticket indicating her set of six numbers.

Later that day, Bob accesses the central lottery authority via an online Web site and attempts to purchase a lottery ticket corresponding to Alice's previously selected set of six numbers. The central lottery authority determines that no more lottery tickets can be associated with that lottery number combination and refuses to sell the lottery ticket to Bob.

Bob decides to let the central lottery authority pick his lottery number combination. Because he does not want to pay $2.50 for a single lottery ticket, Bob requests that his six lottery numbers be unique at the time they are selected. Bob also requests that his lottery number combination not be provided as a quick pick to any other player. Bob is told, however, that it is possible he will have to share the top prize if another player manually requests the same set of numbers at a later time. Bob provides payment of $1.25 for this type of lottery ticket.

In another example, Carol purchases a lottery ticket associated with a lottery number combination. She pays an extra $1.00 to a lottery authority in exchange for an assurance that she will not be required to share the top jackpot prize with anyone else if her lottery number combination is selected as a winning number combination. Later that day, the lottery authority sells another lottery ticket having the same lottery number combination to Dan, who decides to not pay the extra $1.00 for such an assurance. That night, the lottery authority determines that the top jackpot prize is ten million dollars and selects Carol's lottery number combination (which is also Dan's lottery number combination) as the winning number combination. Carol receives the full ten million dollar prize (e.g., the same amount she would have received if Dan did not buy a lottery ticket with the same lottery number combination), and Dan receives a five million dollar prize (e.g., the amount he would have received if the original ten million dollar prize was shared with Carol).

In another example, Emily purchases a first lottery ticket. The top jackpot prize at the time she purchases the first lottery ticket is one million dollars, and a lottery authority charges Emily $1.00 for the first lottery ticket. A large number of other players also purchase lottery tickets, and the top jackpot prize increases to five million dollars. Emily is excited about the large prize and decides to purchase a second lottery ticket. Because the top jackpot prize is now five million dollars, the lottery authority charges her $1.50 for the second lottery ticket.

In another example, Fred purchases a lottery ticket for a first lottery drawing. The top jackpot prize at the time he purchases the lottery ticket is one million dollars, and a lottery authority charges him $1.00 for the lottery ticket. That night, the lottery authority selects a winning number combination and determines that no player has won the top jackpot prize. The one million dollars is applied to the next lottery drawing, resulting in a top jackpot prize of two million dollars. Fred decides to purchase another lottery ticket for this lottery drawing, and the lottery authority charges him $1.25 based on the increase in the top jackpot prize.

Lottery System

Figure 2:
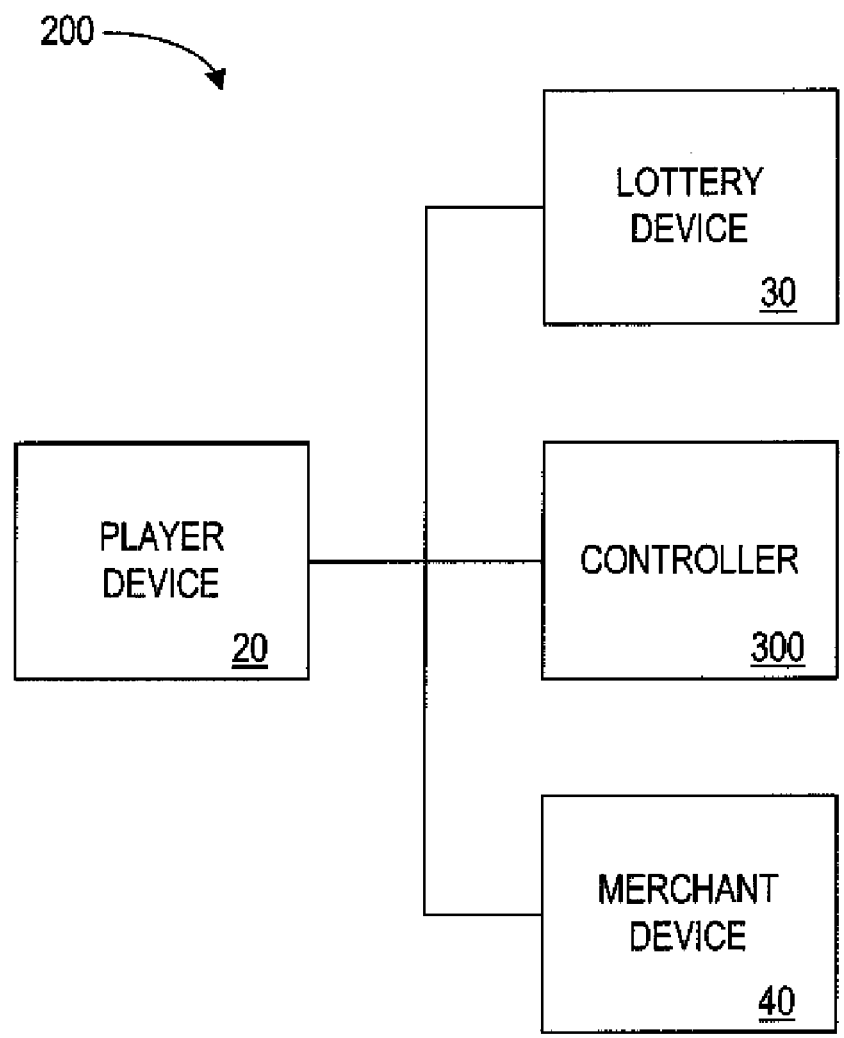
FIG. 2 is a block diagram overview of a lottery system according to an embodiment of the present invention.

FIG. 2 is a block diagram overview of a lottery system 200 according to one embodiment of the present invention. As will be described, the lottery system 200 may be used to facilitate lottery ticket transactions. The lottery system 200 includes a controller 300 in communication with a player device 20, a lottery device 30, and a merchant device 40. As used herein, devices (such as the controller 300, the player device 20, the lottery device 30, and/or the merchant device 40) may communicate, for example, via a communication network, such as a Local Area Network (LAN), a Metropolitan Area Network (MAN), a Wide Area Network (WAN), a Public Switched Telephone Network (PSTN), a proprietary network, or an Internet Protocol (IP) network such as the Internet, an intranet or an extranet. Moreover, as used herein, communications include those enabled by wired or wireless technology. Note that although a single controller 300 is shown in FIG. 2, any number of controllers 300 may be included in the lottery system 200. Similarly, any number of the other devices described herein may be included according to embodiments of the present invention.

In one embodiment of the present invention, a player device 20 communicates with a remote, Web-based controller 300 (e.g., a server) via the Internet. Although some embodiments of the present invention are described with respect to information exchanged using a Web site, according to other embodiments information may instead be exchanged, for example, via a telephone, an Interactive Voice Response Unit (IVRU), electronic mail, a WEBTV® interface, a cable network interface, and/or a wireless communication system.

A player device 20 may be any device capable of performing the functions described herein. For example, a player device 20 may comprise a Personal Computer (PC), a Personal Digital Assistant (PDA), a one-way or two-way pager, a wired or wireless telephone, a Point Of Sale (POS) terminal, a kiosk (e.g., a kiosk located at a retail store), an Automated Teller Machine (ATM) device, a smart card, or any other appropriate storage and/or communication device. Similarly, the merchant device 40 and/or the lottery device 30 may be any device capable of performing the functions described herein, including any of the devices described with respect to the player device 20. For example, the lottery device 30 may be a central processing system associated with a lottery authority and a merchant device 40 may be a POS terminal capable of (i) reading a lottery ticket slip 900 completed by a player and/or (ii) communicating with the lottery device 30.

Note that devices shown in FIG. 2 need not be in constant communication with other devices. For example, a player's PDA may only communicate with the controller 300 via the Internet when attached to a "docking" station or "cradle" coupled to the player's PC. A player device 20 may also communicate with the controller 300 via an Infra-Red (IR) port when near a POS terminal or kiosk located in a merchant's store.

Any of the controller 300, the player device 20, the lottery device 30, and/or the merchant device 40 may be incorporated in a single device (e.g., a kiosk located in a merchant's store may act as both a merchant device 40 and the player device 20).

According to an embodiment of the present invention, the controller 300 may also communicate with a payment service device (not shown in FIG. 2), such as a credit card service device. For example, the controller 300 may communicate with the payment service device to arrange for a player to provide payment in exchange for a lottery ticket. Similarly, the controller 300 may communicate with the payment service device to arrange to provide payment of a winning amount (e.g., a top lottery prize) to a player.

According to another embodiment, the payment service device may also communicate directly with a player device 20 and/or a merchant device 40. For example, a merchant device 40 may communicate with the payment service device to arrange to provide payment to a player. The payment service device may then communicate with the player device 20 to provide an indication of the payment. According to another embodiment, a merchant device 40 may instead communicate directly with a player device 20.

Controller

Figure 3:
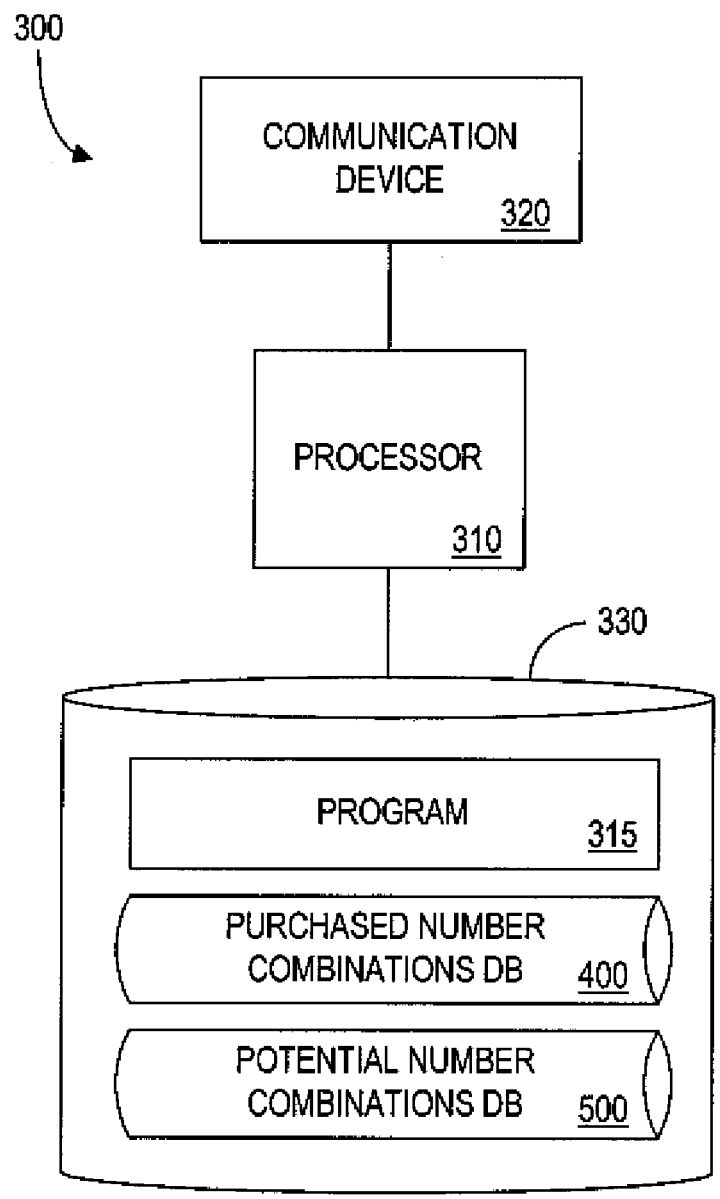
FIG. 3 is a block schematic diagram of a controller according to an embodiment of the present invention.

FIG. 3 illustrates a controller 300 that is descriptive of the device shown in FIG. 2, according to an embodiment of the present invention. The controller 300 comprises a processor 310, such as one or more INTEL® Pentium® processors, coupled to a communication device 320 configured to communicate via a communication network (not shown in FIG. 3). The communication device 320 may be used to communicate, for example, with one or more player devices 20, the lottery device 30, and/or the merchant device 40. Note that any of the player device 20, the lottery device 30, and/or the merchant device 40 may contain similar elements and perform similar functions as those described herein with respect to the controller 300.

The processor 310 is also in communication with a storage device 330. The storage device 330 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 330 stores a program 315 for controlling the processor 310. The processor 310 performs instructions of the program 315, and thereby operates in accordance with the present invention. For example, the processor 310 may receive a request to purchase a lottery ticket, the lottery ticket being associated with a lottery number combination (e.g., a set of lottery numbers). The processor 310 may also receive an indication that the lottery number combination is to be associated with a limited number of occurrences, and determine a price associated with the lottery ticket based on the received indication.

According to another embodiment, the processor 310 may receive from a player a request to purchase a lottery ticket, the lottery ticket to be associated with a lottery number combination. The processor 310 may also receive from the player an indication that the lottery number combination is to be associated with a limited number of lottery tickets, and determine a price associated with the lottery ticket based on the received indication. In addition, the processor may determine the lottery number combination and arrange for the player to purchase the lottery ticket. For example, the processor 310 may receive, from the player, payment of an amount based on the determined price and provide the lottery ticket to the player. The processor 310 may also prevent at least one other lottery ticket from being associated with the lottery number combination. Note that the processor 310 may directly or indirectly prevent other tickets from being associated with the lottery number combination. For example, the processor 310 may simply store or transmit an indication that prevents other tickets from being associated with the lottery number combination. Finally, the processor 310 may arrange for the player to receive payment of a winning amount based on the lottery number combination and a result of a lottery drawing.

According to another embodiment, the processor 310 may receive a request to purchase a pari-mutuel lottery ticket. The processor 310 may also determine a price associated with the pari-mutuel lottery ticket based on an expected value of the lottery ticket to the player.

The program 315 may be stored in a compressed, uncompiled and/or encrypted format. The program 315 may furthermore include other program elements, such as an operating system, a database management system, and/or "device drivers" used by the processor 310 to interface with peripheral devices.

As used herein, information may be "received" by or "transmitted" to, for example: (i) the controller 300 from the player device 20, the lottery device 30, or the merchant device 40; and/or (ii) a software application or module within the controller 300 from another software application, module, or any other source.

As shown in FIG. 3, the storage device 330 also stores: a purchased number combinations database 400 (described in detail with respect to FIG. 4); and a potential number combinations database 500 (described in detail with respect to FIG. 5).

Examples of databases that may be used in connection with the lottery system 200 will now be described in detail with respect to FIGS. 4 and 5. Each figure depicts a database in which the data is organized according to a data structure in accordance with embodiments of the present invention. The data may be stored, for example, on a computer readable medium and be accessible by a program executed on a data processing system. The schematic illustration and accompanying description of these databases are exemplary, and any number of other database arrangements could be employed besides those suggested by the figures.

Purchased Number Combinations Database

Referring to FIG. 4, a table represents the purchased number combinations database 400 that may be stored at the controller 300, according to an embodiment of the present invention. According to other embodiments, the purchased number combinations database 400 may be stored at one or more of the player device 20, the lottery device 30, and/or the merchant device 40. The table includes entries identifying lottery number combinations that have been purchased by one or more players. The table also defines fields 402, 404, 406, 408, 410, 412, 414 for each of the entries. The fields specify: a number combination 402; a ticket identifier 404; a retailer location 406; a date and time of purchase 408; a maximum number of tickets 410; a price 412; and a winning amount at time of purchase 414. The information in the purchased number combinations database 400 may be created and updated, for example, when a player purchases a number via the lottery system 200.

The number combination 402 represents a lottery number combination associated with a lottery ticket purchased by a player. For example, the number combination 402 may comprise six numbers, such as six numbers from the range of "1" through "49," inclusive. Each number combination 402 is associated with at least one ticket identifier 404. The ticket identifier 404 may be, for example, an alphanumeric identifier generated by the controller 300. Note that a single number combination 402 may be associated with more than one ticket identifier 404. For example, as shown in FIG. 4, the number combination 402 of "1, 2, 3, 4, 5, 7" is associated with both "T13235" and "T64312."

The retailer location 406 may indicate the physical location of a retail store where the player purchased a ticket associated with the number combination 402. The retailer location 406 may be used, for example, to let the controller 300 track lottery tickets purchased in different geographic areas or lottery jurisdictions (e.g., so that a player can arrange to have his or her multi-state lottery number combination be unique in New Jersey). The date and time of purchase 408 indicates when the ticket associated with the number combination 402 was purchased.

The maximum number of tickets 410 represents how many lottery tickets may be associated with a particular number combination 402. For example, a particular number combination may be associated with a maximum of one lottery ticket (e.g., the maximum number of tickets 410 is "1"), two lottery tickets, or any number of lottery tickets (e.g., the maximum number of tickets 410 is "no maximum"). As shown in FIG. 4, the number combination 402 of "1, 2, 3, 4, 5, 7" is associated with a maximum number of tickets 408 of both "2" and "no maximum." In this case, the controller 300 may prevent any further lottery tickets from being associated with that number combination 402 (e.g., because the maximum number of two have already been purchased). According to one embodiment, the maximum number of tickets 410 may be "0." In this case, a player has blocked other players from purchasing a ticket associated with a particular number combination 402 without actually purchasing a lottery ticket associated with the number combination 402.

The price 412 indicates a price determined by the controller 300 for the number combination 402 based on the maximum number of tickets 410. For example, the controller 300 may determine that $1.00 is the price when the maximum number of tickets 410 is "no maximum" and use a predetermined formula to determine the price when the maximum number of tickets 410 is equal to a value other than "no maximum."

The winning amount at time of purchase 414 indicates a winning amount or current prize associated with the lottery game at the date and time of purchase 408. The winning amount at time of purchase 414 may be used, for example, to determine an expected value associated with the ticket identifier 404 and/or an appropriate price 412.

According to one embodiment, the purchased number combinations database 400 also stores a player identifier (not shown in FIG. 4) that may indicate the player who purchased the lottery ticket. Such a player identifier may be used, for example, to make sure that number combination 402 is only associated with a maximum number of players.

Potential Number Combinations Database

Referring to FIG. 5, a table represents the potential number combinations database 500 that may be stored at the controller 300, according to an embodiment of the present invention. According to other embodiments, the potential number combinations database 500 may be stored at one or more of the player device 20, the lottery device 30, and/or the merchant device 40.

The table includes entries identifying all possible lottery number combinations that may be purchased by one or more players. The table also defines fields 502, 504, 506, 508 for each of the entries. The fields specify: a number combination identifier 502; a number combination 504; a number of tickets purchased 506; and a maximum number of tickets 508. The information in the potential number combinations database 500 may be created by an operator of the controller 300 (e.g., based on the rules of the lottery game) and updated, for example, when a player purchases a lottery ticket via the lottery system 200.

The number combination identifier 502 may be, for example, an alphanumeric identifier associated with a lottery number combination and may be generated by the controller 300. The number combination 504 indicates a lottery number combination that may be associated with a lottery ticket. The number combination 504 may be based on, or associated with, the number combination 402 stored in the purchased number combinations database 400.

For each number combination identifier 502, the potential number combination database 500 also stores the number of tickets purchased 506 with respect to the number combination 504. The maximum number of tickets 508 indicates how many lottery tickets may be associated with a particular number combination 504 and may be based on, or associated with the maximum number of tickets 410 stored in the purchased number combinations database 400. That is, the maximum number of tickets 508 may be set to the smallest maximum number of tickets 410 stored with respect to that particular number combination 504.

Methods that may be used in connection with the lottery system 200 according to an embodiment of the present invention will now be described in detail with respect to FIGS. 6 through 8.

Lottery System Methods

Figure 6:
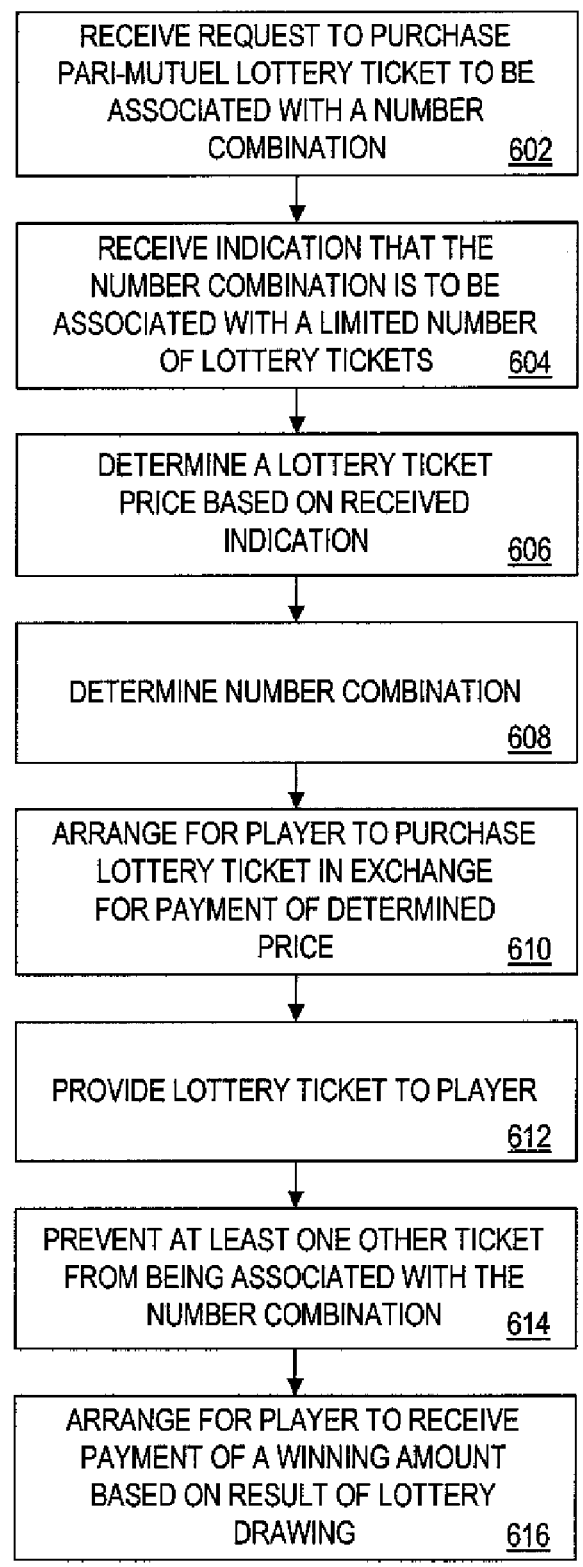
FIG. 6 is a flow chart of a method for selling a lottery ticket according to an embodiment of the present invention.

FIG. 6 is a flow chart of a method for operating the lottery system 200, according to an embodiment of the present invention. The method may be performed, for example, by one or more of the controller 300, the player device 20, the lottery device 30, and/or the merchant device 40. The flow chart in FIG. 6, as well as the other flow charts discussed herein, does not imply a fixed order to the steps, and embodiments of the present invention can be practiced in any order that is practicable.

At 602, a request to purchase a pari-mutuel lottery ticket is received, the lottery ticket to be associated with a lottery number combination. At 604, an indication that the lottery number combination is to be associated with a limited number of lottery tickets is received from the player.

Based on the indication that the lottery number combination is to be associated with the limited number of lottery tickets, a ticket price is determined at 606. For example, a first ticket price may be determined if such an indication is received while a second ticket price is determined if no such indication is received.

At 608, the lottery number combination is determined. For example, a player may select the lottery number combination. According to another embodiment, the player instead allows the lottery system 200 to select his or her lottery number combination. In either case, the lottery system 200 may evaluate a potential lottery number combination to determine if the combination is appropriate. For example, a player who indicates that a lottery number combination should remain unique may not be allowed to select a lottery number combination that is already associated with another lottery ticket (or another player). Methods of performing this process according to some embodiments of the present invention are provided with respect to FIGS. 7A and 7B.

At 610, it is arranged for the player to purchase the lottery ticket, and payment of an amount based on the determined price is received from the player at 610 (e.g., via a payment identifier associated with the player). At 612, the lottery ticket is provided to the player. For example, a lottery terminal at a retail store may print a lottery ticket for the player.

At 614, the lottery system 200 prevents at least one other lottery ticket from being associated with the player's lottery number combination. A method of performing this process according to an embodiment of the present invention is provided with respect to FIG. 8.

Finally, at 616 it is arranged for the player to receive payment of a winning amount based on the player's lottery number combination and a result of a lottery drawing. For example, if all of the lottery numbers in the player's lottery number combination match the result of the lottery drawing the player may receive payment of a winning amount. Note that the player may not have to share this winning amount with more than the limited number of lottery tickets indicated at 604. Of course, if the player had previously arranged to purchase this particular lottery ticket on behalf of a group of friends or co-workers, the winning amount may need to be divided as appropriate.

Figure 7A:
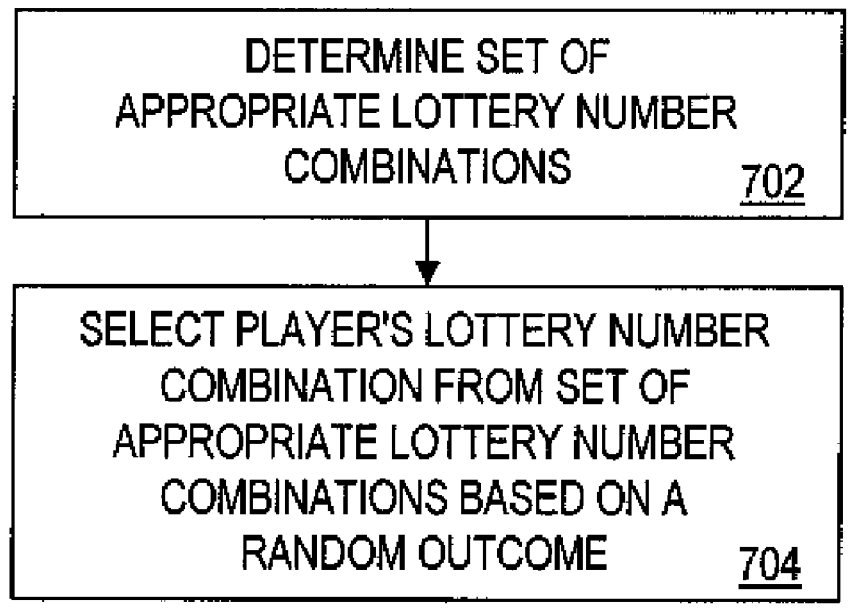
FIG. 7A is a flow chart of a method for selecting a number combination according to an embodiment of the present invention.

FIG. 7A is a flow chart of a method for selecting a number combination according to an embodiment of the present invention. The method may be performed, for example, by the controller 300 to determine a lottery number combination as described with respect to 608 in FIG. 6. In particular, the method may be performed as part of a quick pick process for a player who has requested that his or her lottery number combination be associated with a limited number of occurrences.

At 702, a set of appropriate lottery number combinations is selected. To select the set of appropriate lottery number combinations, the controller 300 may select every lottery number combination that (i) has not already been associated with the player's maximum number of occurrences, and (ii) has not already been associated with another player's maximum number of occurrences.

Consider, for example, a player who has requested that his or her lottery number combination be associated with only a single lottery ticket (i.e., only with his or her lottery ticket). To determine a quick pick lottery number combination for such a player, the controller 300 may determine the set of appropriate lottery number combinations comprising all combinations that are not yet associated with a lottery ticket. This may be performed, for example, by retrieving each number combination identifier 502 associated with a number of tickets purchased 506 of "0" from the potential number combinations database 500.

If the player had instead requested that his or her lottery number combination be associated with no more than three lottery tickets, each number combination identifier 502 associated with a number of tickets purchased 506 of "0," "1," or "2" may be retrieved from the potential number combinations database 500. However, in this case, a number combination for which two tickets have been purchased may not be considered appropriate if one of those two tickets had itself been associated with a request that the number combination be associated with no more than two lottery tickets. In another embodiment, the lottery system 200 may instead retrieve such information from the purchased number combinations database 400.

At 704, the player's lottery number combination is then selected from the set of appropriate lottery number combinations based on a random outcome. For example, one of the number combinations 502 identified at 702 may be selected. Because all of the appropriate lottery number combinations were associated with an appropriate number of tickets purchased 506, the controller 300 can be sure that the associated number combination 504 is available to be associated with the player's lottery ticket in accordance with his or her request. According to one embodiment, the purchased number combinations database 400 and/or the potential number combinations database 500 are updated at this point.

Figure 7B:
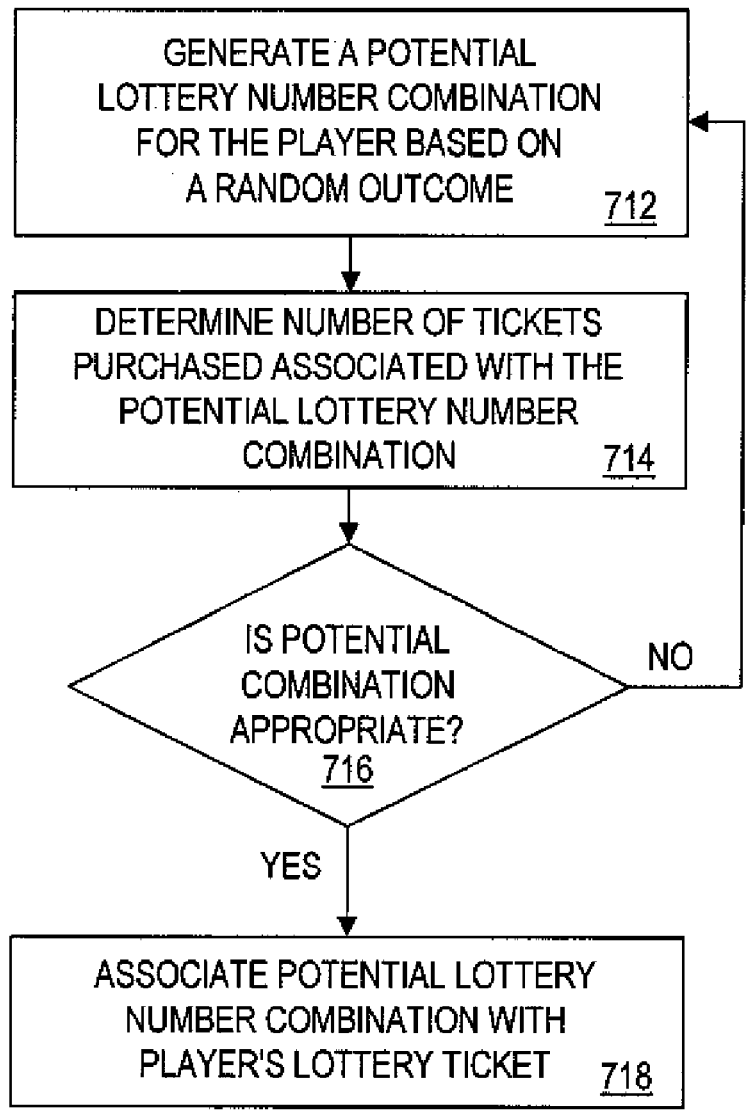
FIG. 7B is a flow chart of another method for selecting a number combination according to an embodiment of the present invention.

FIG. 7B is a flow chart of another method for selecting a number combination according to an embodiment of the present invention. The method may be performed, for example, by the controller 300 to determine a lottery number combination as described with respect to 608 in FIG. 6. In particular, the method may be performed as part of a quick pick process for a player who has requested that his or her lottery number combination be associated with a limited number of occurrences.

At 712, a potential lottery number combination is generated for the player based on a random outcome. According to this embodiment, the potential lottery number combination is generated without regard to the limited number of occurrences requested by the player.

At 714, the number of tickets that have been purchased associated with the potential lottery number combination is determined. For example, the controller 300 may determine the number of entries associated with the potential lottery number combination in the purchased number combinations database 400 or may retrieve the number of tickets purchased 506 from the potential number combinations database 500.

At 716, it is determined if the potential lottery number combination is appropriate. For example, if the player had requested that his or her lottery number combination be associated with a single lottery ticket, a potential lottery number combination that has already been associated with another lottery ticket would not be appropriate.

If the potential lottery number combination is not appropriate at 716, another potential lottery number combination is determined at 712. If the potential lottery number combination is appropriate at 716, the potential lottery number combination is associated with the player's lottery ticket at 718. According to one embodiment, the purchased number combinations database 400 and/or the potential number combinations database 500 are updated at this point.

Note that if a player manually selects a lottery number combination that is to be associated with a limited number of occurrences (as opposed to using a quick pick process as described with respect to FIGS. 7A and 7B), the controller may simply evaluate the manually selected lottery number combination to determine if it is available to be associated with the player's lottery ticket in accordance with his or her request. For example, the controller 300 may determine the number of entries associated with that lottery number combination in the purchased number combinations database 400 or may retrieve the number of tickets purchased 506 from the potential number combinations database 500.

Figure 8:
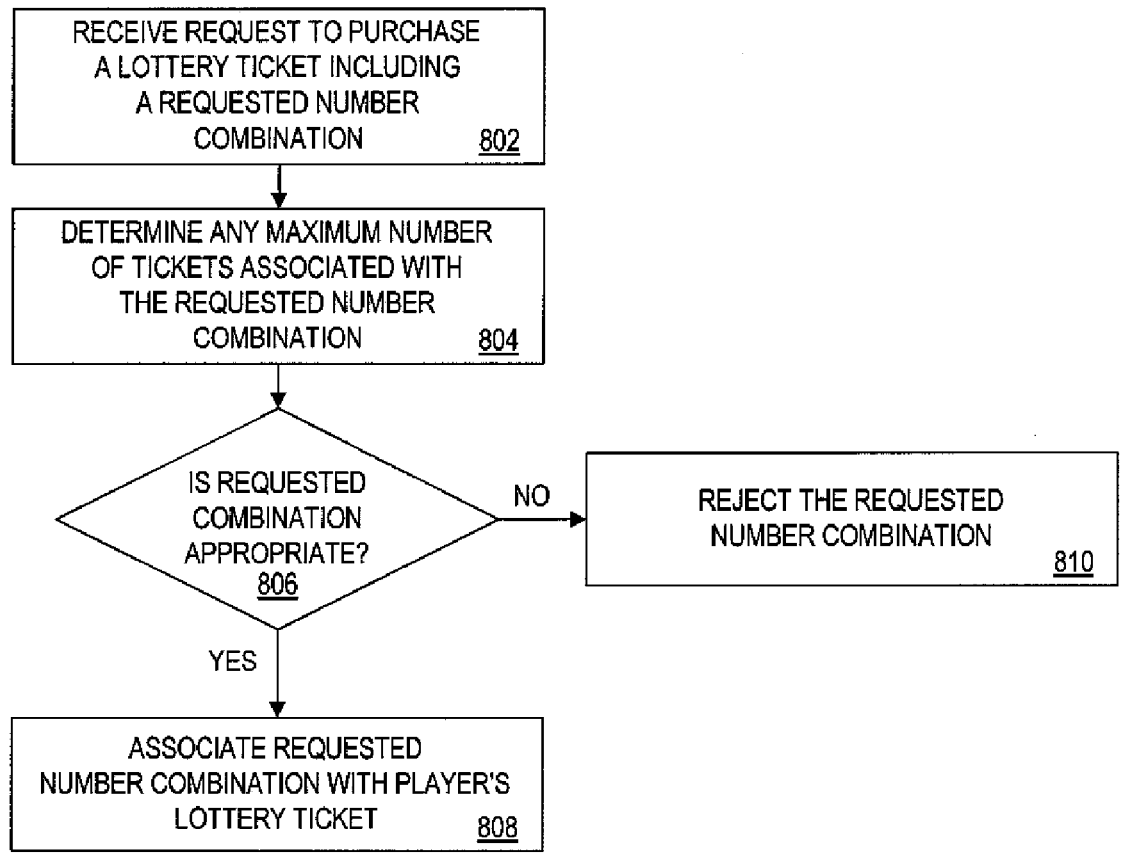
FIG. 8 is a flow chart of a method for processing a request to purchase a subsequent lottery ticket according to an embodiment of the present invention.

FIG. 8 is a flow chart of a method for processing a request to purchase a subsequent lottery ticket according to an embodiment of the present invention. The method may be performed, for example, by the controller 300 to prevent at least one other lottery ticket from being associated with a lottery number combination as described with respect to 614 of FIG. 6.

At 802, a request to purchase a lottery ticket is received, including a manually selected lottery number combination. At 804, the controller 300 accesses the purchased number combinations database 400 to determine any maximum number of tickets 410 associated with the requested number combination 402. According to another embodiment, the controller 300 may instead access the potential number combinations database 500 to determine any maximum number of tickets 508 associated with the requested number combination 504.

At 806, it is determined if the requested lottery number combination is appropriate. That is, the controller may determine if the maximum number of tickets 508 associated with the requested lottery number combination have already been purchased (e.g. based on the number of entries associated with the requested number combination 402 in the purchased number combinations database 400 or the number of tickets purchased 506 in the potential number combinations database 500).

If the requested number combination is appropriate at 806, it is associated with the player's lottery ticket at 808. If the requested number combination is not appropriate at 806, it is rejected at 810 (e.g., the player may be asked to request another number combination or a modified number combination may be suggested to the player).

ADDITIONAL EMBODIMENTS

The following are several examples which illustrate various embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described system and methods to accommodate these and other embodiments and applications.

According to one embodiment, a player provides something other than an increased amount of payment in exchange for having his or her lottery number combination be associated with a limited number of occurrences. By way of example, a player may: register to join a frequent lottery player program; purchase a predetermined number of tickets in a particular drawing; purchase a lottery ticket subscription (e.g., for a predetermined number of tickets or a lifetime subscription); purchase a lottery ticket at a predetermined retail store or Web site; purchase a supplemental product (e.g., the player purchases at least five gallons of gasoline along with his or her lottery ticket); purchase a predetermined amount of supplemental products (e.g., the player purchases ten dollars worth of items at a retail store); purchase a lottery ticket when a winning amount is below a predetermined amount; and/or purchase a lottery ticket before a predetermined number of tickets have been sold for a particular lottery drawing; accept an offer from a third party (e.g., the player agrees to answer ten survey questions). Similarly, a player's lottery number combination may be associated with a limited number of occurrences because of past actions (e.g., the player has purchased at least one lottery ticket in the last four weeks) or future actions (e.g., the player promises to perform an action in the future).

A player's lottery number combination may also be associated with a limited number of occurrences when the player purchases a particular type of lottery ticket, such as those described in U.S. patent application Ser. No. 09/525,875 now issued as U.S. Pat. No. 6,969,318 and entitled "System and Method for Applying Lottery Multipliers" and/or U.S. patent application Ser. No. 09/052,295 now issued as U.S. Pat. No. 6,086,477 and entitled "Methods and Apparatus Wherein a Lottery Entry is Entered Into Lottery Drawings Until the Lottery Entry is Identified as a Winner."

Although some embodiments described above provide that a player's lottery number combination will be associated with a limited number of occurrences (e.g., at the time the lottery ticket is sold or at the time a lottery result is determined), according to other embodiments it is merely more likely that the player's lottery number combination will be associated with a limited number of occurrences. Consider, for example, a lottery game in which a player selects six lottery numbers from the range of "1" though "49," inclusive. A lottery ticket has a price of $1.00 unless the player selects "49" as one of his or her lottery numbers, in which case the lottery ticket has a price of $2.00. Because some players will not want to pay $2.00, someone who does select "49" as one of his or her lottery numbers will have a reduced chance that a winning amount will need to be shared with other players.

According to another embodiment, a player indicates the price he or she is willing to pay for a lottery ticket, and a limited number of occurrences to be associated with the player's lottery numbers is determined based on that price. Similarly, the lottery system may determine a price associated with a lottery ticket (e.g., when a lottery ticket is to be provided to a player in lieu of an amount of change due to the player as a result of another transaction), and a limited number of occurrences to be associated with the player's lottery numbers is determined based on that price.

According to another embodiment, the price of another item may be determined based on a limited number of occurrences that are to be associated with a lottery number combination. For example, the player who indicates that a first lottery ticket is to be associated with only a single occurrence may pay a higher price for the next lottery ticket he or she purchases. Similarly, the price of another item may be determined based on an actual number of occurrences that were associated with a lottery number combination.

According to another embodiment, a price associated with a lottery ticket may be adjusted after the lottery ticket has been sold to a player. For example, a first player may pay $10.00 for a first lottery ticket having a unique lottery number combination. If a second player subsequently purchases a second lottery ticket having the same lottery number combination, the price associated with the first lottery ticket may be adjusted (e.g., a $5.00 rebate may be mailed to the first player or credited to an account associated with the first player).

According to another embodiment, a player may indicate that his or her lottery number combination is to not be associated with a set of players (or lottery tickets). For example, a player may indicate that the lottery number combination is not to be associated with lottery tickets sold in a particular city.

According to another embodiment, a player may prevent other players from being associated with a particular lottery number combination without actually purchasing a ticket. For example, a friend of a player may pay $100.00 to a lottery authority to have the player's favorite numbers "reserved" for ten years. In this case, the player would not receive a prize unless he or she also purchased a lottery ticket associated with that lottery number combination for a particular lottery game drawing.

According to another embodiment, when a player is told that his or her requested lottery number combination is not available (e.g., because a second player has already purchased those numbers), the player may perform an action in order to be associated with those numbers (e.g., by agreeing to provide payment of a predetermined or negotiated amount to the second player).

According to another embodiment, the price of a lottery ticket is determined based on at least one parameter received from a player. The parameter may indicate, for example, a desired uniqueness of a lottery number combination.

According to another embodiment, a player is assured that he or she will be assigned a unique lottery number combination at the time of a lottery drawing, but is not assured which lottery number combination he or she will be assigned. For example, the lottery number combination may be determined by a lottery game provider after tickets are no longer sold to players (e.g., at 9:00 PM on the night of a lottery drawing). According to another embodiment, a player's lottery number combination may automatically change (e.g., a modified lottery number combination may be assigned to the player when a second player requests his or her original lottery number combination). In either case, a player may receive an indication of his or her final lottery number combination prior to a lottery drawing, such as via an electronic mail message.

According to another embodiment, a price or a prize may be determined based on a number of tickets that have already been purchased. For example, a first player to purchase a lottery ticket associated with a lottery number combination may be eligible to win six million dollars, while a second player to purchase a lottery ticket associated with that lottery number combination may only be eligible to win three million dollars.

According to still another embodiment, a lottery number combination may only be associated with a limited number of occurrences when certain predetermined conditions are met. For example, a player may indicate that his or her lottery number combination should be associated with a single lottery ticket if the top lottery prize is less than ten million dollars. If the top lottery prize grows to be more than ten million dollars, however, the lottery number combination may be associated with two lottery tickets.

Yet another embodiment of the present invention is directed to a lottery game for which a player does not need to purchase a lottery ticket. For example, a merchant may sponsor a sweepstakes and give away lottery tickets to a customer each time he or she purchases an item at the merchant's store. In this case, a customer may provide a payment to the merchant to make sure his or her lottery number combination is associated with a limited number of occurrences.

In another embodiment, a price associated with the lottery ticket is determined based on a number of other players who actually request to purchase a ticket having the same lottery number combination and are prohibited from doing so.

Although some embodiments of the present invention are described with respect to a player having to share a top prize, according to other embodiments a lottery game may be associated with a number of different prizes (e.g., for matching 4 out of six numbers). According to an embodiment of the present invention, a player may be assured that any subset, or all, of such prizes will not need to be shared if he or she wins the prize.

In yet another embodiment, a player may be required to perform a task in exchange for an assurance that his or her lottery number combination will be associated with only a limited number of occurrences. For example, a player may be assured that his or her lottery number combination will be unique if he or she fills out a survey included on the back of a lottery ticket slip.

In yet another embodiment, an auction may determine which player will be associated with a lottery number combination (e.g., when two or more players request the same lottery number combination).

In yet another embodiment, the lottery system 200 may automatically determine a number of tickets based on a determined price. For example, a player may request to purchase $100.00 worth of lottery tickets, each being uniquely associated with a different lottery number combination. In this case, the lottery system 200 may determine a price of $1.25 per lottery ticket, and automatically provide the player with eighty lottery tickets.

In yet another embodiment, the indication that a lottery number combination is to be associated with a limited number of occurrences is received from the lottery system 200. For example, all tickets in a certain type of lottery game may be given unique lottery number combinations. According to another embodiment, the limited number of occurrences may be based on, for example, a current total winning amount. For example, the limited number of occurrence may be "1" when the current total winning amount is less than one million, "2" when the current total winning amount is more than one million and less than two million, etc.

Although many embodiments described above are directed to pari-mutuel lotteries, the present invention may also be used with respect to, for example, pari-mutuel racetrack betting. For example, some types of racetrack bets require that a player select, in order, the top three horses that will win a race. According to an embodiment of the present invention, a player may also request that his or her selections be associated with a limited number of occurrences (e.g., that his or her selections be unique). According to other embodiments, a player may be assured that his or her selections in a sporting wager (e.g., a college basketball playoff tree) will be associated with a limited number of occurrences.

According to another embodiment, a player is assured that a lottery number combination will be associated with a limited number of occurrences only with respect to one or more particular distribution channels or services. For example, a player who purchases a lottery ticket via a communication network (e.g., a Web site or wireless phone service) may be assured that his or her lottery number combination will be associated with a limited number of occurrences only with respect to other lottery tickets sold via that communication network. In this case, another player may, for example, visit a retailer to purchase another lottery ticket having the same lottery number combination.

According to another embodiment, a player is assured that a lottery number combination will be associated with a limited number of occurrences only with respect to a particular class of players (e.g., frequent players or subscribers to a lottery service). For example, a frequent player may be assured that his or her lottery number combination will be associated with a limited number of occurrences only with respect to other lottery tickets sold to non-frequent players. In this case, another frequent player may be permitted to purchase another lottery ticket having the same lottery number combination.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer program product, comprising a computer usable medium having a computer readable program code embodied therein, said computer readable program code adapted to be executed by a processor to:

sell, to a player, a lottery ticket having an assigned lottery number combination, wherein the lottery number combination is, in response to a request for exclusivity by the player, guaranteed to be exclusively sold to the player for a predetermined number of lottery drawings, wherein each lottery drawing allows duplicate lottery number combinations to be sold, and wherein the predetermined number of lottery drawings is greater than one.

2. The computer program product of claim 1, wherein the predetermined number of lottery drawings is associated with a lottery ticket subscription.

3. The computer program product of claim 1, wherein the predetermined number of lottery drawings is defined by the request for exclusivity made by the player.

4. The computer program product of claim 1, wherein the predetermined number of lottery drawings comprises all future lottery drawings in which the player participates.

5. The computer program product of claim 1, wherein the computer readable program code is further adapted to be executed by the processor to:

receive, from a player device, an indication of a request by the player to purchase the lottery ticket; and receive, from the player device, an indication of the request for exclusivity made by the player.

6. The computer program product of claim 5, wherein the selling is conducted at least in part based on the receiving of the indications occurring when a winning amount of at least one of the number of lottery drawings is less than a predetermined amount.

7. The computer program product of claim 5, wherein the selling is conducted at least in part based on the receiving of the indications occurring before a predetermined number of tickets have been sold for at least one of the number of lottery drawings.

8. The computer program product of claim 5, wherein the selling is conducted at least in part based on a status of the player.

9. The computer program product of claim 1, further comprising:

preventing, after the selling, at least one other lottery ticket from being assigned to the lottery number combination.

10. The computer program product of claim 9, wherein the at least one additional lottery ticket is associated with a particular class of player.

11. The computer program product of claim 10, wherein the particular class of player is defined by the player.

12. The computer program product of claim 9, wherein the at least one other lottery ticket comprises at least one lottery ticket issued in each of at least two lottery drawings.

13. The computer program product of claim 1, wherein the computer readable program code is further adapted to be executed by the processor to:
determine the lottery number combination.

14. The computer program product of claim 13, wherein the computer readable program code is further adapted to be executed by the processor to:
provide, to a player device, an indication of the lottery number combination.

15. The computer program product of claim 1, wherein the computer readable program code is further adapted to be executed by the processor to:
determine an lottery ticket identifier associated with the lottery ticket.

16. The computer program product of claim 15, wherein the computer readable program code is further adapted to be executed by the processor to:
provide, to a player device, an indication of the lottery ticket identifier.

17. The computer program product of claim 1, wherein the computer readable program code is further adapted to be executed by the processor to:
store an indication of a price for the lottery ticket.

18. The computer program product of claim 17, wherein the computer readable program code is further adapted to be executed by the processor to:
determine the price based at least in part on the request for exclusivity made by the player.

19. The computer program product of claim 1, wherein the computer readable program code is further adapted to be executed by the processor to:
cause a printing of the lottery ticket, the lottery ticket comprising an indicia of the lottery number combination.

20. The computer program product of claim 1, wherein the selling is conducted via a player device.

21. The computer program product of claim 20, wherein the player device comprises a lottery terminal.

22. The computer program product of claim 21, wherein the player device comprises a lottery terminal at a retail store.

23. A method, comprising:
issuing, by a lottery controller, a first lottery ticket to a first player, the first lottery ticket comprising an indication of a lottery number combination valid for entry into a first lottery drawing;
receiving, by the lottery controller, an indication of a request by the first player to prohibit the lottery number combination from being indicated on a second lottery ticket associated with a second lottery drawing; and
prohibiting, by the lottery controller and in response to the receiving, the lottery number combination from being indicated on the second lottery ticket associated with the second lottery drawing.

24. The method of claim 23, further comprising:
receiving, from a player device, an indication of a request by the player to purchase the first lottery ticket; and
wherein the of the indication of the prohibit request comprises: receiving, from the player device, an indication of rule governing when the lottery number combination may be issued in future lottery drawings.

25. The method of claim 24, wherein the prohibiting is conducted at least in part in response to the receiving of the indication of rule.

26. The method of claim 23, wherein the second lottery drawing comprises a type of lottery drawing for which the first player has indicted that the lottery number combination can not be used by another player.

27. The method of claim 23, further comprising:
determining the lottery number combination.

28. The method of claim 27, further comprising:
providing, to a player device, an indication of the lottery number combination.

29. The method of claim 23, further comprising:
determining an lottery ticket identifier associated with the first lottery ticket.

30. The method of claim 29, further comprising:
providing, to a player device, an indication of the lottery ticket identifier.

31. The method of claim 23, further comprising:
storing an indication of a price for the first lottery ticket.

32. The method of claim 31, further comprising:
determining the price based at least in part on the prohibit request made by the first player.

33. The method of claim 23, further comprising:
causing a printing of the first lottery ticket.

34. The method of claim 23, wherein the second lottery ticket is associated with a particular class of player.

35. The method of claim 34, wherein the particular class of player is defined by the first player.

36. The method of claim 23, wherein the preventing is conducted at least in part based on the issuing occurring when a winning amount of the first lottery drawing is less than a predetermined amount.

37. The method of claim 23, wherein the preventing is conducted at least in part based on the issuing occurring before a predetermined number of tickets have been sold for the first lottery drawing.

38. The method of claim 23, wherein the preventing is conducted at least in part based on a status of the first player.

39. The method of claim 23, wherein the issuing is conducted via a player device.

40. The method of claim 39, wherein the player device comprises a lottery terminal.

41. The method of claim 40, wherein the player device comprises a lottery terminal at a retail store.

42. A method, comprising:
receiving, by a controller and from a player device, an indication of a request by a first player to purchase a first lottery ticket for a first lottery drawing, wherein the first lottery drawing allows duplicate entries;
receiving, by the controller and from the player device, an indication of a request by a player that a lottery number combination assigned to the first lottery ticket be prohibited from being issued with a second lottery ticket; and
providing, by the controller, an assurance that the lottery number combination assigned to the first lottery ticket will be prohibited from being issued with the second lottery ticket.

43. The method of claim 42, wherein the second lottery ticket is for the first lottery drawing.

44. The method of claim 42, wherein the second lottery ticket is for a second lottery drawing.

45. The method of claim 42, further comprising:
prohibiting the lottery number combination assigned to the first lottery ticket from being issued with the second lottery ticket.

46. The method of claim 45, wherein the prohibiting is based at least in part on the receiving of the indication of the request by the player that the lottery number combination assigned to the first lottery ticket be prevented from being issued with the second lottery ticket.

47. The method of claim 42, wherein the request that the lottery number combination assigned to the first lottery ticket be prohibited from being issued with the second lottery ticket is made by the first player.

48. The method of claim 42, wherein the second lottery ticket is associated with a second player.

49. The method of claim 42, further comprising:
determining the lottery number combination.

50. The method of claim 49, further comprising:
providing, to the player device, an indication of the lottery number combination.

51. The method of claim 42, further comprising:
determining an lottery ticket identifier associated with the first lottery ticket.

52. The method of claim 51, further comprising:
providing, to the player device, an indication of the lottery ticket identifier.

53. The method of claim 42, further comprising:
storing an indication of a price for the first lottery ticket.

54. The method of claim 53, further comprising:
determining the price based at least in part on the receiving of the indication of the request by the player that the lottery number combination assigned to the first lottery ticket be prohibited from being issued with the second lottery ticket.

55. The method of claim 42, further comprising:
causing a printing of the first lottery ticket.

56. The method of claim 42, wherein the second lottery ticket is associated with a particular class of player.

57. The method of claim 56, wherein the particular class of player is defined by the first player.

58. The method of claim 42, wherein the providing is conducted at least in part based on the receiving of the indications occurring when a winning amount of the first lottery drawing is less than a predetermined amount.

59. The method of claim 42, wherein the providing is conducted at least in part based on the receiving of the indications occurring before a predetermined number of tickets have been sold for the first lottery drawing.

60. The method of claim 42, wherein the providing is conducted at least in part based on a status of the first player.

61. The method of claim 42, wherein the player device comprises a lottery terminal.

62. The method of claim 61, wherein the player device comprises a lottery terminal at a retail store.

63. A system comprising:
a user interface; and
a controller operatively coupled to the user interface and adapted to:
receive, from the user interface, an indication of a request by a first player to purchase a first lottery ticket for a first lottery drawing, wherein the first lottery drawing allows duplicate entries;
receive, from the user interface, an indication of a request by the first player that a lottery number combination assigned to the first lottery ticket be prevented from being issued with a second lottery ticket; and
provide an assurance that the lottery number combination assigned to the first lottery ticket will be prohibited from being issued with the second lottery ticket.

64. The system of claim 63, wherein the system is embodied in a mobile terminal.

65. The system of claim 63, wherein the user interface is embodied in a mobile terminal.

66. The system of claim 65, wherein the mobile terminal comprises one or more of a PDA, a pager, a telephone, and a smart card.

* * * * *